(12) United States Patent
Mare et al.

(10) Patent No.: US 11,574,039 B2
(45) Date of Patent: Feb. 7, 2023

(54) EFFORTLESS AUTHENTICATION FOR DESKTOP COMPUTERS USING WRIST WEARABLE TOKENS

(71) Applicant: THE TRUSTEES OF DARTMOUTH COLLEGE, Hanover, NH (US)

(72) Inventors: Shrirang Mare, Seattle, WA (US); David Kotz, Lyme, NH (US); Ronald Peterson, Brattleboro, VT (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 80 days.

(21) Appl. No.: 17/261,691

(22) PCT Filed: Jul. 19, 2019

(86) PCT No.: PCT/US2019/042657
§ 371 (c)(1),
(2) Date: Jan. 20, 2021

(87) PCT Pub. No.: WO2020/018940
PCT Pub. Date: Jan. 23, 2020

(65) Prior Publication Data
US 2021/0264012 A1  Aug. 26, 2021

Related U.S. Application Data

(60) Provisional application No. 62/701,225, filed on Jul. 20, 2018.

(51) Int. Cl.
| G06F 21/00 | (2013.01) |
| G06F 21/35 | (2013.01) |
| H04W 12/63 | (2021.01) |

(52) U.S. Cl.
CPC ............ *G06F 21/35* (2013.01); *H04W 12/63* (2021.01)

(58) Field of Classification Search
CPC .... H04W 12/63; G06F 21/35; H04L 63/0853; H04L 63/0861
See application file for complete search history.

(56) References Cited

U.S. PATENT DOCUMENTS

| 9,832,206 B2 | 11/2017 | Mare et al. |
| 2010/0289749 A1 | 11/2010 | Ahn |

(Continued)

FOREIGN PATENT DOCUMENTS

| EP | 2600319 A1 | 6/2013 |
| EP | 3001714 A1 | 3/2016 |

(Continued)

OTHER PUBLICATIONS

International Patent Application No. PCT/US2019/042657, International Search Report and Written Opinion dated Nov. 21, 2019, 16 pgs.

*Primary Examiner* — Joseph P Hirl
*Assistant Examiner* — Chi D Nguy
(74) *Attorney, Agent, or Firm* — Lathrop GPM LLP (57) ABSTRACT

A system and method for authenticating users of a digital device includes an authentication device attached to an authorized user. The authentication device includes one or more motion sensors and acts as a user identity token. To authenticate with a digital device, the user performs one or more interactions with the digital device using the hand associated with the authentication device. The digital device correlates the inputs received due to the interactions with the user's hand and/or wrist movement, as measured by the authentication device. Access to the digital device is allowed if the inputs and movements are correlated.

22 Claims, 7 Drawing Sheets

(56) References Cited

U.S. PATENT DOCUMENTS

| | | |
|---|---|---|
| 2012/0235912 A1 | 9/2012 | Laubach |
| 2014/0309030 A1 | 10/2014 | Feng et al. |
| 2015/0222517 A1 | 8/2015 | Mclaughlin et al. |
| 2016/0050217 A1 | 2/2016 | Mare et al. |
| 2016/0224779 A1* | 8/2016 | Kitane ................ H04L 63/0861 |
| 2017/0177213 A1* | 6/2017 | Yim .................. H04M 1/72463 |
| 2017/0193314 A1* | 7/2017 | Kim ....................... G09G 5/003 |
| 2018/0064388 A1* | 3/2018 | Heneghan .......... A61B 5/02438 |
| 2018/0249000 A1* | 8/2018 | Kim .................. H04M 1/72412 |
| 2021/0247849 A1* | 8/2021 | Sokol .................... G06F 3/0213 |

FOREIGN PATENT DOCUMENTS

| | | |
|---|---|---|
| KR | 10-1685027 B1 | 12/2016 |
| WO | WO 2015/083012 A1 | 6/2015 |
| WO | WO 2016/018029 A1 | 2/2016 |

\* cited by examiner

EFFORTLESS AUTHENTICATION FOR DESKTOP COMPUTERS USING WRIST WEARABLE TOKENS

RELATED APPLICATIONS

The present application is a 35 U.S.C. § 371 filing of International Application No. PCT/US2019/042657 filed 19 Jul. 2019, which claims priority to U.S. Provisional Patent Application No. 62/701,225 filed 20 Jul. 2018, the contents of which are incorporated herein by reference in its entirety.

GOVERNMENT RIGHTS

This invention was made with government support under grant No. CNS-1329686 awarded by the National Science Foundation. The government has certain rights in the invention.

BACKGROUND

Authentication has become an integral part of computer usage. To authenticate to a computer, users must typically exert mental effort (e.g., recall their password) and/or physical effort (e.g., type their password). These factors increase the cost of context switch for users—cost of switching attention from a primary task to the authentication step and back to the task—disrupting users' workflow. The disruption due to a single authentication instance may be negligible, but in some shared-desktop workplaces where authentication must be performed multiple times a day, the disruption quickly becomes time consuming and frustrating. For example, hospital settings typically require employees to log-in close to a hundred times daily at different workstations, often for just a few moments; according to an industry report, hospital staff spend about 30 to 45 minutes a day authenticating to computers and web applications. As a result, frustrated users devise workarounds to make the authentication process more convenient; however, this leaves computers and data vulnerable.

Proximity-based authentication methods may provide a usable, zero-effort, secure authentication solution, but they have two drawbacks: they do not work well in multi-user shared settings and they may cause unintended authentications. Typically, in a proximity-based authentication method, a user carries a wireless authentication token that authenticates the user to a target computer. Whenever the user is within a certain distance of the target computer—as determined by radio signal strength from the token—the user is automatically authenticated to the computer. Some implementations require an additional condition that there should be some input to the target computer (presumably from the user) before the user is logged in, but there is no verification that the input was indeed provided by the user being authenticated. Multi-user shared settings are problematic for proximity-based methods because when there are multiple authorized users near a computer, all within the authentication distance threshold, these methods cannot determine which user (if any) should be authenticated. The second problem with proximity-based authentication methods is that a user may accidentally get authenticated without her consent, e.g., when she may just be passing by or present in the next room (or cubicle). Furthermore, adversaries can circumvent the distance threshold by using relay attacks and can cause a user to be authenticated even if the user is far outside the set authentication distance threshold.

SUMMARY

An underlying cause for the above shortcomings of proximity-based authentication methods is that they do not require an explicit intent for authentication. That is, a user does not have to explicitly convey an intent to authenticate to the target computer. Instead, proximity-based methods infer user intent based on user's proximity to the target computer: if a user is "near" a computer, proximity-based methods assume that the user wants to log in to that computer (or at least it is okay to log in the user). The distance threshold for nearness depends on the underlying proximity protocol and can range from 20 cm (for NFC) to 10 m (e.g., for Bluetooth). But, using relay attacks, an adversary can extend this range by orders of magnitude. Thus, proximity-based authentication leaves a computer vulnerable when the computer is used outside a physically secure environment or when used in multi-user shared settings.

One aspect of the present embodiments includes the realization that proximity-based authentication is insecure in a multi-user shared setting because user intent to authenticate is assumed by proximity. The present embodiments solve this problem by detecting user intent to authenticate using an authentication token such as a wristband, where a quick low-effort movement is detected as the intent to authenticate before authentication is initiated. Advantageously, this prevents the user from being authenticated when no authentication is intended.

A system and method for authenticating a user to a computer or other digital device uses a wristband or other authentication token together with user input that captures user intent for authentication.

In an embodiment, a method for authenticating an authorized user wearing an authentication device comprising at least one accelerometer, a digital radio and a processor, to a locked digital device, includes steps of detecting an intent action input from an input apparatus of the digital device; sending a query to an authentication device in radio proximity of the digital device, said query comprising start and end times of the intent action: receiving a set of data points representing authentication device motion data between the start and end times in the query from the authentication device; correlating the set of data points with the detected intent action input and sending a correlation message to the authentication device; and receiving an authentication response from the authentication device and unlocking the digital device based on the authentication response.

In a further embodiment, the correlation message further comprises a success message ($M_s$), a failure message ($M_f$) or a retry message ($M_r$).

In another embodiment, after the correlating step the method includes receiving an okay-to-authenticate message ($M_a$) from the authentication device; and sending authentication request message ($M_{ack}$) to the authentication device.

In an embodiment, a plurality of authentication devices are In yet another located in radio proximity of the digital device and the digital device sends a query to each of the plurality of authentication devices.

In an embodiment, the method includes establishing a session key when the authentication device is within radio proximity of the digital device, said session key based on a public-key exchange during activation of the authentication device.

In an embodiment, a system includes at least one authentication device adapted to be attached to an arm or wrist of an authorized user, the authentication device including at least one accelerometer; a digital radio; and an authentication device processor configured to provide motion data detected by the at least one accelerometer in response to a query message received by the digital radio; and at least one digital device comprising at least one digital radio adapted to communicate with the at least one digital radio of the authentication device, at least one input apparatus and at least one digital device processor configured to detect an intent action performed using the at least one input apparatus; send a query to the authentication device, the query comprising an identification and time span of the intent action; receive motion data from the authentication device; and correlate the intent action and the motion data, the motion data corresponding to the timespan of the query, and to allow access to the digital device if correlation succeeds.

In a further embodiment, the system includes a plurality of authentication devices and a plurality of digital devices.

In an embodiment, a computer program product includes a non-transitory computer readable medium which stores a set of instructions to perform a security operation, the set of instructions, when carried out by computerized circuitry, causes the computerized circuitry to perform a method of detecting an intent action input from an input apparatus of a digital device in a multi-user shared digital device system; sending a query to one or more authentication devices in radio proximity of the digital device, said query comprising start and end times of the intent action: receiving a set of data points representing authentication device motion data between the start and end times in the query from the one or more authentication devices; correlating received sets of data points with the detected intent action input and sending a correlation messages to the one or more authentication devices indicating that the correlation was successful ($M_s$), or that the correlation failed ($M_f$), or that two or more authentication devices sent a set of data points that correlated with the intent action input ($M_r$); if $M_s$ was sent to a designated authentication device, receiving an okay-to-authenticate message ($M_a$) from the designated authentication device; sending an authentication request message ($M_{ack}$) to the designated authentication device; receiving an authentication response (ACK) from the designated authentication device; and unlocking the digital device.

In an embodiment, an authentication device for authenticating an authorized user to a locked digital device is adapted to be worn by the authorized user and includes at least one accelerometer, a digital radio and a processor, the processor adapted to execute instructions stored in a non-transitory computer readable medium to perform a method including receiving a query from the locked digital device, said query comprising start and end times of an intent action performed using an input apparatus of the locked digital device with an arm associated with the authentication device; extracting motion data from a buffer and generating a set of data points representing authentication device motion data between the start and end times in the query; sending the set of data points to the digital device for correlation with data points generated from the input apparatus; receiving a response from the digital device: if the response is a success message ($M_s$), returning an okay-to-authenticate message ($M_a$); if the response if a failure message ($M_f$) or a retry message ($M_r$), alerting the authorized user to retry the intent action.

In a further embodiment, wherein if the authentication device receives more than one success message ($M_s$), returning a retry message ($M_r$).

In another embodiment, the processor is adapted to execute instructions stored in a non-transitory computer readable medium to perform a method wherein extracting motion data from the buffer further includes extracting motion data between approximately the start and end times in the query from a buffer in the authentication device; analyzing the motion data to classify it as an intent action identified in the query or some other motion; and extracting a set of data points representing the motion data.

In any of the above embodiments, an input apparatus includes a keyboard or mouse. Further, an intent action may include tapping a key multiple times, where the number of times may vary depending on the use case or user preference, or moving a mouse through a plurality of direction changes.

DETAILED DESCRIPTION

Embodiments below are described in terms of multi-user shared-digital device settings in, for example, hospitals and other enterprise environments. A characteristic of this setting is the presence of multiple digital devices and multiple authorized users. A further characteristic is that multiple authorized users may be near one digital device simultaneously such that proximity-based authentication alone may not be sufficient for allowing access to the digital device. The disclosed systems and methods may be easily adapted to a variety of digital devices, including any shared device that can recognize gesture or tap inputs such as a desktop computer, laptop computer or tablet computer. The disclosed systems and methods may be further adapted to other digital devices such as a TV/monitor, smart appliance, door, game controller, medical device, automobile or any digital device that incorporates an input apparatus capable of recognizing gesture or tap inputs. The systems and methods may also be adapted to non-shared desktops, laptops, tablets or other digital devices that may be locked and unlocked regularly. A digital device is in an "unlocked" mode when no authentication is required to use the device, and the device is in a "locked" mode when a user has to authenticate to use the device. Thus, a user unlocks a digital device by authenticating to it, and a user locks a device by either an explicit action (e.g., logging out or initiating screen lock) or an implicit action (e.g., not using the digital device for longer than some threshold period of time).

User intentionality is an important principle of user authentication—a user should be authenticated to a device only if she intends to authenticate to that device. In authentication methods where a user manually provides authentication credentials (e.g., username and password, fingerprint), the act of providing the credentials conveys the user's intent, but in methods where credentials are wirelessly shared (e.g., proximity-based methods using a token), user intent is inferred and proximity-based methods may incorrectly lead to security errors. These errors may be addressed by adding a user-input step to make user intent explicit in an otherwise zero-effort proximity-based authentication method while keeping the overall method usable and non-disruptive to the user's workflow.

To express authentication intent, a user needs to specify two things: 1) that the user intends to authenticate (to something), and 2) the authentication target, for example, the digital device or desktop to which the user wants to authenticate.

Figure 1:
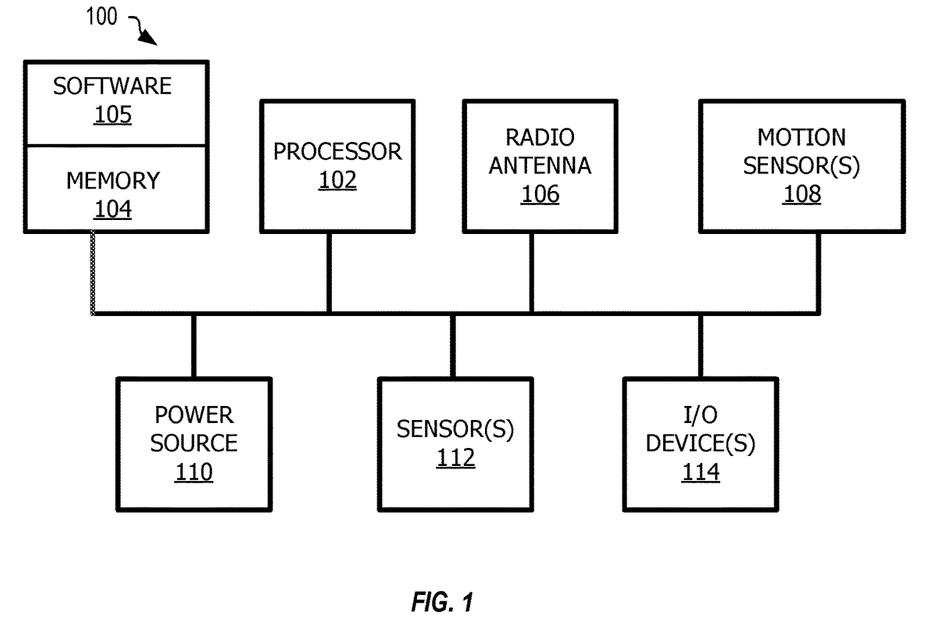
FIG. 1 depicts a block diagram of an embodiment of an authentication device.

In an embodiment, an authentication method may be performed using an embodiment of an authentication device 100 as shown in the block diagram of FIG. 1. Authentication device 100 is designed to be attached to an arm or wrist of an authorized user using a wristband (not shown). A wristband may be a strap attached with a buckle, or an elastic band, for example. Authentication device 100 has a processor 102 and associated computer readable memory 104 storing machine-readable instructions in software 105 for execution by processor 102. Memory 104 also stores, for example, encryption keys, identity information, and other data used in the functioning of authentication device 100. A radio antenna 106 is adapted for communication of access-related information with digital devices. The communication may be encrypted. One or more motion sensors 108 may be adapted to detect and measure movements of any arm to which the wristband is attached. In an embodiment, motion sensors 108 may include one or more accelerometers, gyroscopes or other sensors for detecting motion.

In an embodiment, authentication device 100 includes a power source 110, which may include a rechargeable battery, low voltage detector and an inductive coil or connection point for recharging the battery. Power source 110 may also incorporate a "batteryless" device, such as a capacitor, for storing energy harvested from the movements. In any of the disclosed embodiments, power source 110 represents a mechanism for providing power to operate the components of FIG. 1. In a further embodiment, authentication device 100 may include one or more sensors 112, for example an open-band sensor or biometric-measurement sensor (such as a fingerprint sensor or bioimpedance sensor); these sensors 112 are to detect when the authentication device is removed from an authorized user and/or to authenticate the authorized user to the authentication device. Additionally, authentication device 100 may also include one or more input/output devices 114 such as a display, keypad or buttons or other devices for interacting with the authentication device.

Although an authentication device may be described herein as a wristband, the structure of FIG. 1 may be implemented in other forms that may be worn or carried by a user, such as a ring or a clip-on device, as long as it is positioned so that hand and/or arm movements of the user may be sensed by the device. In any embodiment, "wristband" may be understood as an authentication device.

Figure 2:
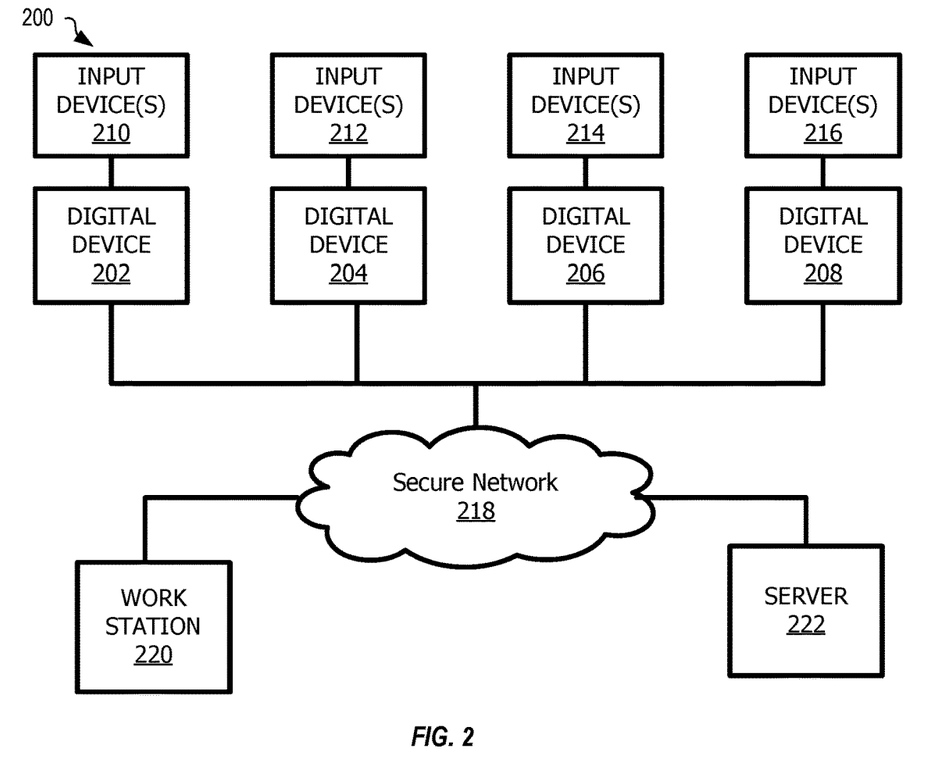
FIG. 2 depicts a block diagram of an embodiment of multi-user shared digital device system.
Figure 3:
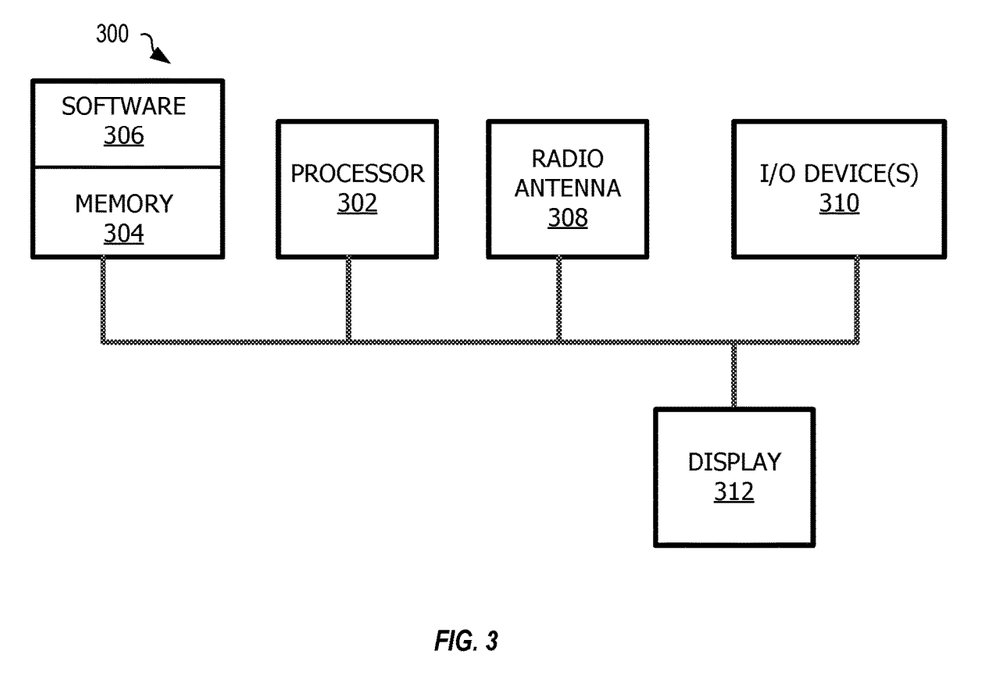
FIG. 3 depicts a block diagram of a digital device of FIG. 2.

FIG. 2 depicts an embodiment of a multi-user shared digital device system 200. A plurality of digital devices 202, 204, 206 and 208, discussed in more detail in FIG. 3, are connected to a secure network 218. Network 218 may be provided by a (wired or wireless) local area network (LAN) or other mechanism for interconnecting digital devices. Each digital device 202, 204, 206 and 208 is operatively coupled to one or more input devices 210, 212, 214 and 216, respectively. In an embodiment, an input device may be any device that can recognize gesture or tap interactions such as a button, touchscreen, touchpad, keyboard, mouse, trackball, or other input apparatus.

System 200 may also include a work station 220, which may be a digital device with additional equipment and functionality for overall management of the system. For example, work station 220 may be adapted for charging one or more wristbands or activating a wristband for use with digital devices 202, 204, 206 or 208. In an embodiment, activating a wristband for a user may include an identification of that user and an exchange of security keys between the wristband and the system.

In an embodiment, system 200 may also include a server 222. Server 222 may maintain and provide access to a database of security information and authorized users as well as other information necessary for the functioning of system 200. In a further embodiment, work station 220 and server 222 may be combined in one apparatus, or may be located in one or more of digital devices 202, 204, 206 or 208.

FIG. 3 shows a more detailed block diagram of a digital device 300 for use in the system of FIG. 2. Digital device 300 has a processor 302 and associated computer readable memory 304 storing machine-readable instructions in software 306 for execution by processor 302. Memory 304 also stores, for example, encryption keys, identity information, an access-control database and other data used in the functioning of digital device 300. A radio antenna 308 is adapted for communication of access-related information with authentication devices (FIG. 1). Radio antenna 308 may also be adapted for communication with secure network 218 of FIG. 2, or this communication may be provided through another (wired or wireless) network. In an embodiment, communication between elements of FIG. 2 may occur using any communication protocol suitable for use between digital devices, and may also be encrypted. In an embodiment, a plurality of radio antennas 308 may be provided for different communication protocols, for example, NFC, Bluetooth or Wi-Fi. The digital device may also have a display 312 and at least one input device 310 such as a button, mouse, touchscreen, touchpad, keyboard, or trackball, or other manually-manipulated digital input device.

Figure 4:
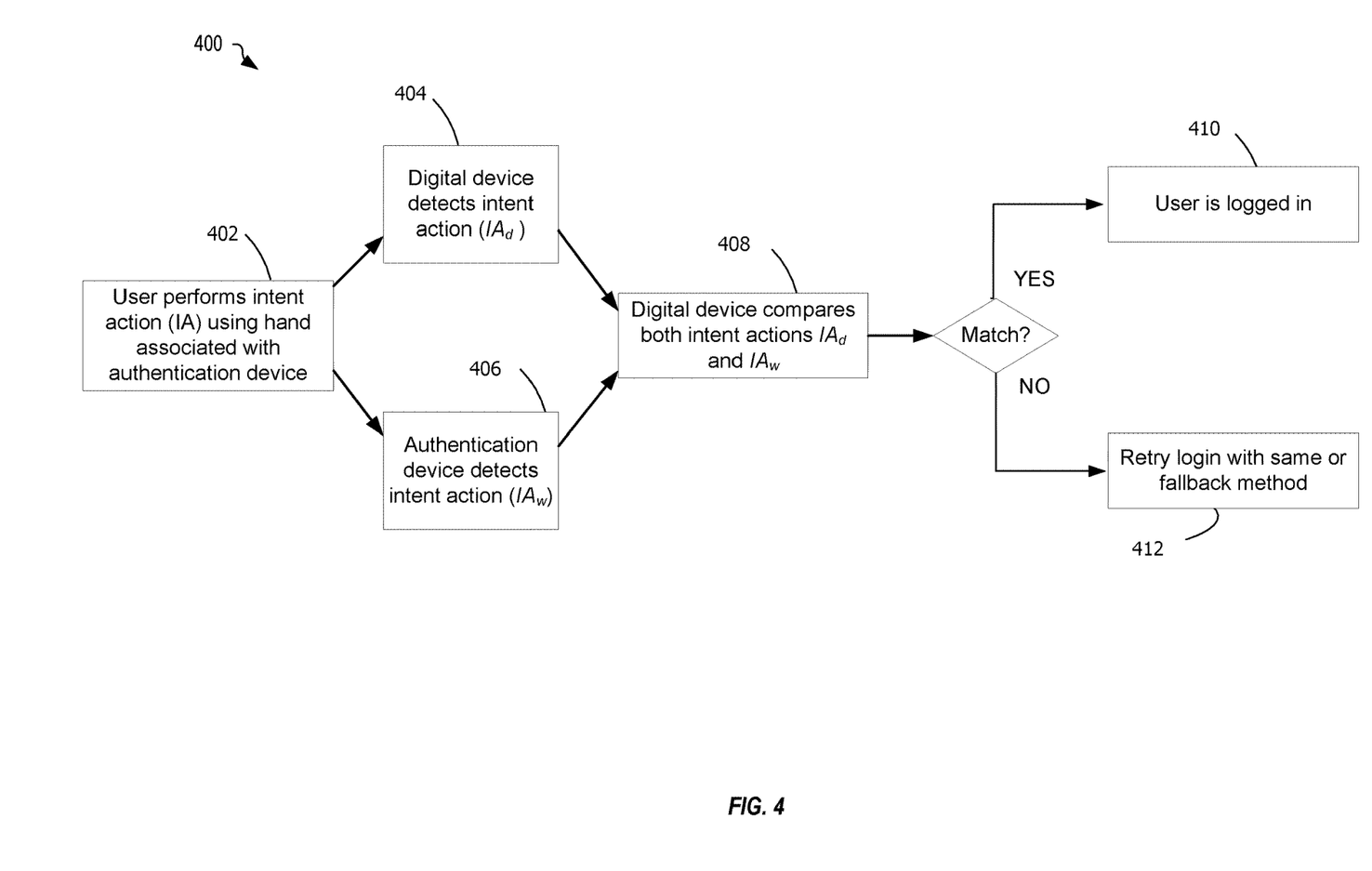
FIG. 4 depicts an example of the authentication method of FIG. 1.

In an embodiment, FIG. 4 depicts a method 400 for authenticating a user wearing an authentication device 100 to a digital device 300 such as a desktop in a multi-user system 200 using simple interactions with the digital device, such as tapping on a keyboard or wiggling a mouse. An authentication device acts as the user's identity token, and to authenticate to a digital device, the user performs a predefined intent action on the computer, for example, taps a key on the keyboard multiple times or wiggles the mouse with the wristband hand as shown at 402. The intent action is detected by the digital device and the authentication device independently. The digital device detects the action using inputs from a keyboard, mouse or other input device as shown at 404 while the authentication device detects the action using data from accelerometer and/or gyroscope sensors as shown at 406. The intent actions are correlated by the digital device at 408. If a match is found, the user is logged in at 410. Otherwise, the user is asked to retry the authentication as 412 or to login using an alternative method, such as a username and password.

In an embodiment, the method provides user authentication for desktop and laptop computers or other digital devices using natural actions such as tapping on the keyboard or wiggling the mouse. These examples are not limiting, and there are many other input actions that may be used, such as tracing a shape on a screen. Users are familiar with these actions and often perform them to invoke the login screen on desktop computers. Leveraging these actions, the authentication method blends seamlessly in users' workflow and includes:

1. An authentication method (i.e., login method) for desktop and laptop computers and other digital devices. This method provides a usable and quick login. In particular, the authentication method, from a user's perspective, has only one step—perform an action on the keyboard or mouse such as tapping a key five times or wiggling the mouse. The digital device automatically verifies the user (using the correlation method described below) and grants the user access.

2. A correlation method for comparing motion data from a wristband worn by a user and the keyboard and mouse inputs received by the computer. This correlation method is fast and works with either type of desktop/laptop input (i.e., keyboard input, mouse input, or both together). Any type of input using physical motion may be used.

In an embodiment, an authentication method of FIG. 4 uses an authentication device 100 of FIG. 1 with accelerometer and/or gyroscope sensors and a radio (e.g., Bluetooth) to communicate with a target digital device or desktop 300 of FIG. 3. Authentication device 100 may detect when it is worn and when it is taken off from the wrist using sensors 112. Sensors 112 could include, for example, an optical sensor as used in Apple Watch® or a sensor attached to the clasp that triggers when the watch is worn or taken off. In an activation step described in more detail below, the authentication device or wristband is securely associated to its wearer (to prevent any unintended sharing) by detecting when it is taken off and requiring the wearer, when she dons the wristband, to reconfirm her identity using a PIN (Personal Identification Number), a biometric such as bioimpedance, or any other convenient and secure method.

To use authentication device 100 for authentication on a digital device 300, the authentication device 100 should be paired with the digital device 300, and activated with the user's identity; the pairing and activation steps are described in detail below. Wearing a paired and activated wristband, a user approaches a target desktop and performs an action that conveys the user's intent to log in; for example, tapping a key on the keyboard 5 times (Tap-5×) or moving a mouse side-to-side (Mouse-wiggle). Although the authentication protocol is described as using 5 taps on a keyboard, any number of taps may be used depending on system needs and user preference. The protocol and method to identify the user (among multiple nearby users) who should be authenticated and logged in to the target desktop is described below.

Intent Action and Correlation Events

An intent action generates two data signals, one in the desktop in the form of keyboard or mouse inputs, and another in the wristband in the form of wrist-motion data. Intuitively, since there is one source for both the signals, they should correlate.

Figure 5A:
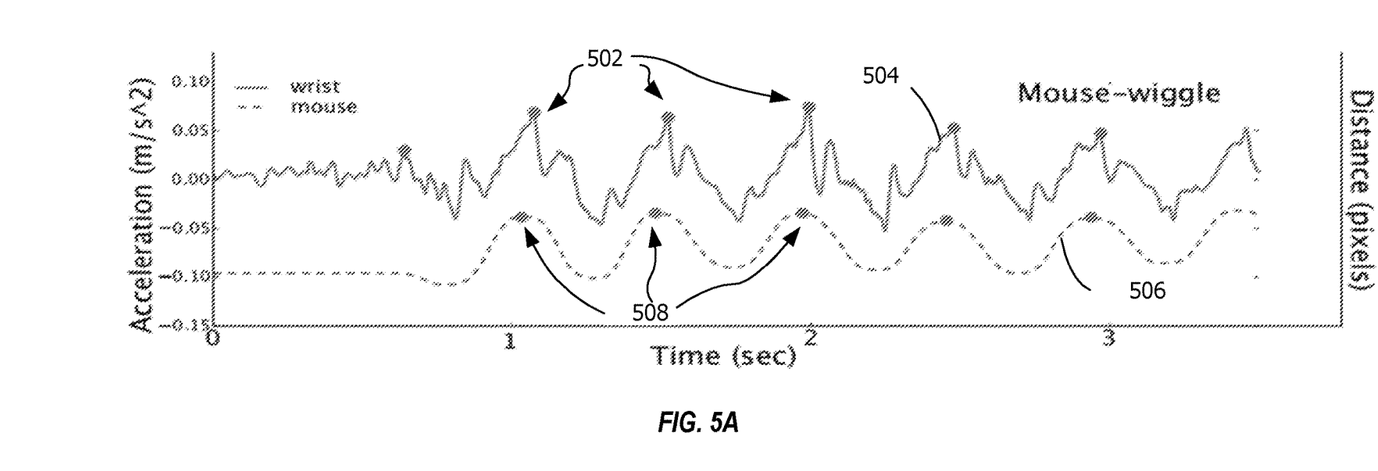
FIGS. 5A and 5B are example graphs depicting intent action data generated by a user of a digital device when wearing a wristband, in an embodiment.
Figure 5B:
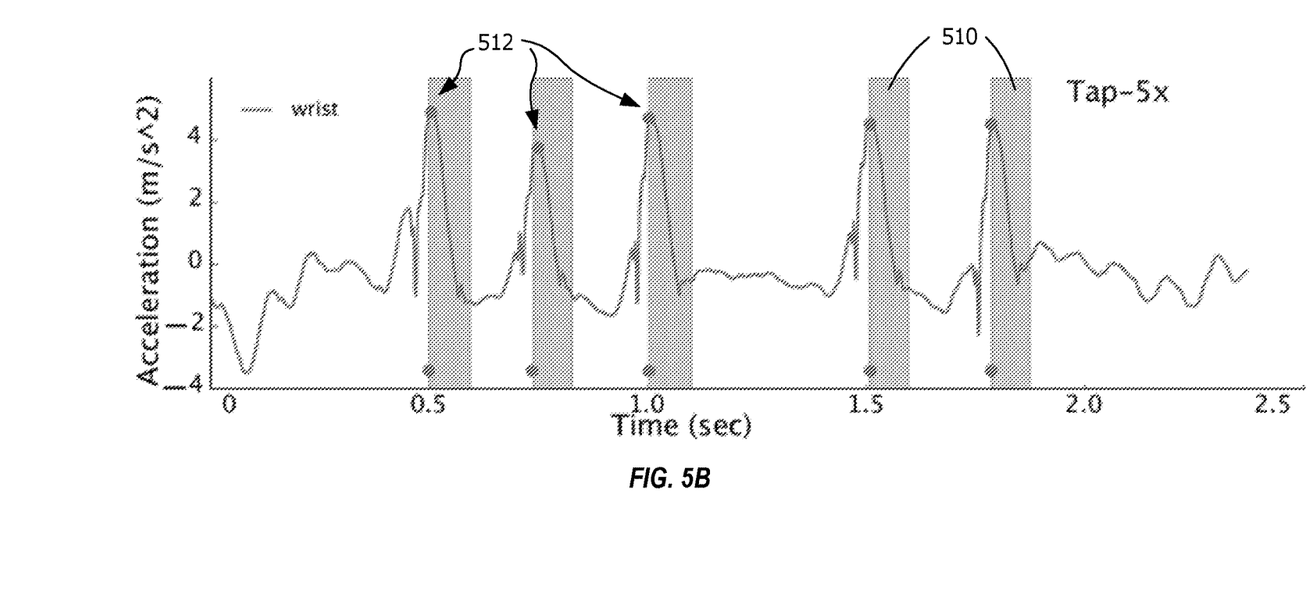

In an embodiment, the intent actions involve specific events that can be measured in both signals, and using the timing of each event it is possible link the two signals and identify the user (the wristband) that performed the intent action. These specific events are referred to as correlation events, and the moments in the intent action related to these correlation events are referred to as correlation points. FIG. 5A shows a graph of intent actions with correlation points, represented at 502 and 508, along accelerometer data stream and desktop input stream from a representative Mouse-wiggle action. The dotted line 506 shows the mouse displacement (in pixels) along the direction of the wiggle (x-axis of the mouse), and the solid line 504 shows linear acceleration along the x-axis of the wristband, which happened to align with the x-axis of the mouse. FIG. 5B shows a representative Tap-5× action, where a user pressed the spacebar key, or any other key or button of a desktop, five times. Correlation points are represented, for example, at 512. Highlighted regions 510 show the duration of the keypress (i.e., KeyDown to KeyUp event) for each tap.

Protocol

Figure 6:
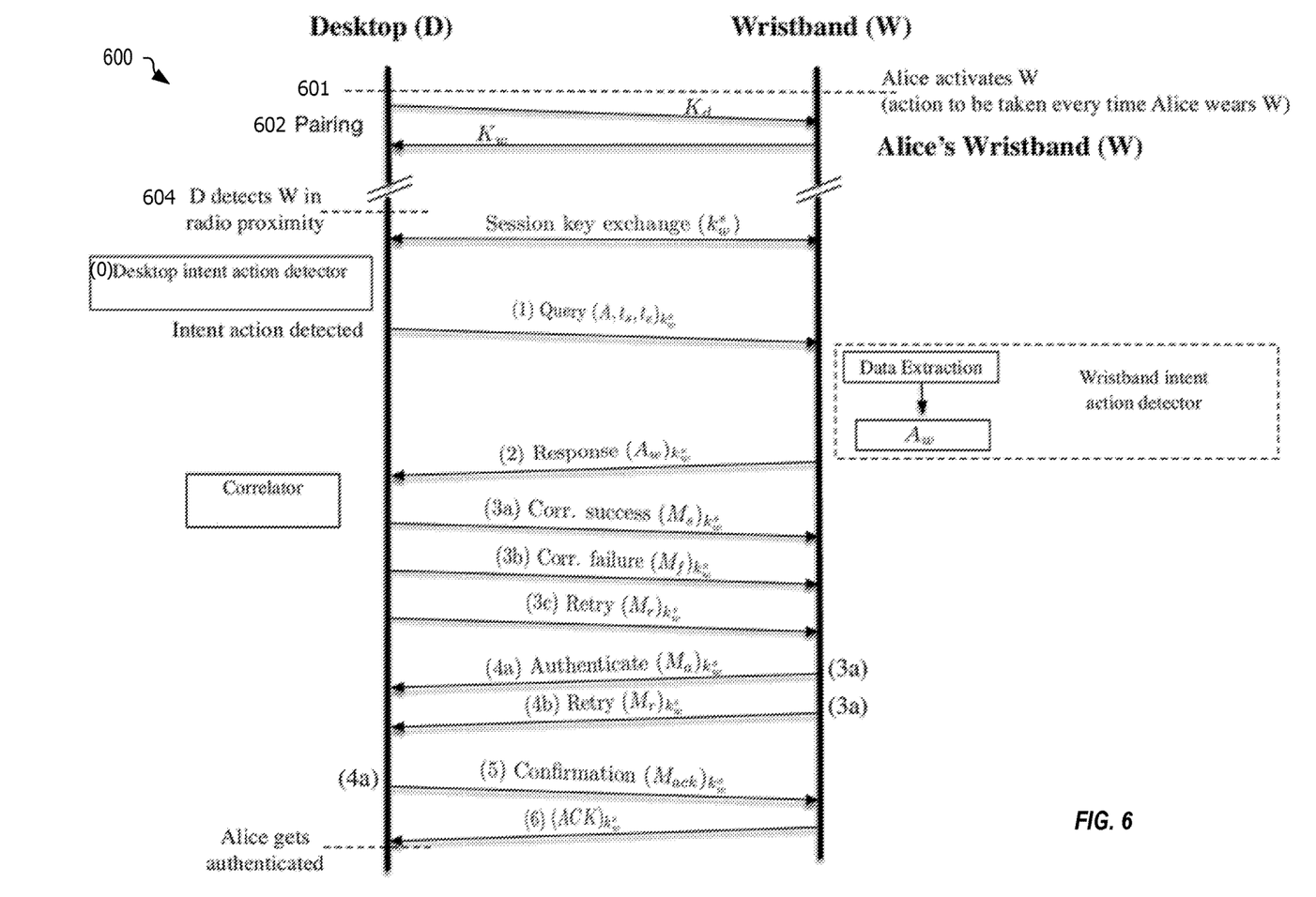
FIG. 6 depicts an authentication protocol for use with the method of FIG. 1.

As shown in FIG. 6, in an embodiment there are several steps in an authentication protocol 600. Although specific steps are shown and discussed, the authentication protocol is not limited to this specific sequence. Other steps may be added and some steps that are shown may not be necessary depending on the specific multi-user setting. FIG. 6 shows a wristband activation step 601, where a user, referred to as Alice, activates the wristband when she wears it at the start of her workday or any time the wristband has been removed then reattached. After activating the wristband, the wristband serves as her authentication token, henceforth named as Alice's Wristband (W). Although embodiments below are discussed in terms of a wristband, a variety of authentication tokens may be used.

Wristband Activation and Bootstrapping Secure Communication

During the wristband pairing step 602, Alice pairs her wristband W with target desktop D. In an embodiment, pairing step 602 may only be performed once between a wristband and a desktop. As part of the pairing process, the desktop and the wristband share their public keys $K_d$ and $K_w$, respectively, with each other. In an alternative embodiment, wristbands may be paired with plurality of desktops using a centralized system. Using $K_d$ and $K_w$, desktop D and wristband W establish a secure communication when they are in radio proximity. In an embodiment, a protocol such as SlyFi may be used, to prevent replay and MITM attacks, and for source authenticity (i.e., verifying the source of a message). With SlyFi, when Alice arrives within the radio proximity of the desktop as shown at 604, Alice's wristband and the target desktop establish a session key ($k_w^s$) using the public keys that were shared during the pairing process. This session key, which is shared only between target desktop D and Alice's wristband W, is used to secure their communication, and the desktop thereby uses this key to bind any communication with Alice to Alice's identity for the duration of this session. Although a specific communication protocol has been described, any protocol that provides secure communication between a wristband and a desktop may be used. The following steps describe an authentication method.

Authentication Protocol as Shown in FIG. 6

(0) Initial step: The authentication method is initiated when a locked desktop D detects keyboard or mouse input that resembles the intent action.

(1) Query step: Desktop D sends a query message to wristbands in radio proximity with start and end times ($t_s$, $t_e$) of the intent action relative to message transmission time, where $t_s < t_e < 0$. The receiving wristband extracts wrist motion data in the time window ($t_{rx}+t_s$, $t_{rx}+t_e$), where $t_{rx}$ is the message receive time. Only wristbands within radio range (approximately 1-10 meters depending on the wireless protocol) are considered as candidate wristbands; this simple proximity threshold (filter) is an optimization, and may be further constrained depending on particular use cases.

(2) Candidate response step: Among the nearby wristbands, each wristband determines if it is a candidate for this request. If a wristband is a candidate, it detects the intent action in the extracted motion data and computes a set of correlation points $A_w$ corresponding to the intent action, which is then sent to the desktop for correlation with the desktop's intent action sequence $A_d$; if the wristband is not a candidate, it sends $A_w$ as an empty set.

(3) Correlation step: Desktop D correlates all the wristband sequences ($A_w$) it receives with its own intent action sequence ($A_d$) to find the best-matching sequences.

(3a) If D finds only one match with high confidence, D sends a successful correlation message $M_s$ to that wristband indicating that the user can be authenticated.

(3b) If the correlation fails for a sequence received from a wristband, D sends a failure message $M_f$ to that wristband indicating failed authentication.

(3c) Disambiguation step: If, on the other hand, there are two (or more) wristbands that correlate with the intent action, D asks those users to repeat the intent action by sending a retry message $M_r$. Alternatively, D can fall back to a default authentication method like username and password.

(4) Wristband confirmation step: In this step the wristband confirms to the desktop that the user should be authenticated. This step ensures that the user is not authenticated to multiple desktops at the same time. In a many-to-one use case (many users, one desktop), a wristband can be a candidate for only one desktop. In a many-to-many use case, a wristband might be a candidate for two (or more) desktops; such a wristband sends its motion data to all such desktops, and waits for their response.

(4a) If the candidate wristband receives a message $M_s$ from only one desktop, it responds with an okay-to-authenticate message $M_a$, which includes Alice's identity.

(4b) If the candidate wristband receives $M_s$ from multiple desktops, the candidate wristband denies authentication to all desktops with a retry message $M_r$, indicating that the desktops should ask the user to authenticate again, as in the step (3c).

(4c) If the candidate wristband does not receive $M_s$, but receives $M_f$ or $M_r$, it alerts the user, indicating that an authentication attempt was made and it failed, and she should try again.

(5) Desktop confirmation step: After D receives $M_a$ from a wristband and it is ready to authenticate, it sends a message $M_{ack}$ requesting a final confirmation from the wristband to authenticate the user.

(6) User authentication: The wristband sends an ACK confirming that the user can be authenticated. The wristband can also be configured to alert the user that she has been logged in to desktop D, or require a confirmation from the user before sending the final ACK to the desktop.

In an embodiment, the communication between wristband W and the desktop D is reliable, i.e., the underlying MAC or other protocol layer in the communication stack handles message failures and guarantees message delivery. If the communication breaks between the wristband and the desktop, the authentication protocol aborts and the user is not authenticated. Further details about various steps in the authentication method are discussed below.

Desktop Intent Action Detector

When a locked desktop receives keyboard or mouse input, it determines whether the input is an intent action, i.e., Tap-5× or Mouse-wiggle. When a desktop is unlocked (i.e., user is currently logged in), it does not look for intent actions, and hence, does not initiate the authentication protocol even if an intent action is deliberately provided. Otherwise, detecting an intent action on desktop is straightforward: Tap-5× is a sequence of five (or more) keystrokes on the same key in quick succession; Mouse-wiggle is a rapid side-to-side displacement of the mouse pointer along the x-axis with small displacement (if any) along the y-axis.

On receiving an intent action, the target desktop initiates the authentication protocol by sending a query message $M_q$ to all the nearby wristbands. (In an embodiment, desktops keep track of wristbands that are in radio proximity; in other embodiments, desktops use broadcast protocols to reach all nearby wristbands.) The query message $M_q=(A, t_s, t_e)$ includes the type of action (A, i.e. Tap-5× or Mouse-wiggle), and the start and end times ($t_s$, $t_e$) of the action relative to when the query message is transmitted; the receiving wristband extracts the motion sensor data corresponding to this action by adding the relative start and end times to the message receive time. If $T_s$, $T_e$ are the start and end time of the intent action and $T_{tx}$ is the time when the desktop transmits the query message, $t_s=T_s-T_{tx}$ and $t_e=T_e-T_{tx}$.

Authentication Device Intent Action Detector

When an authentication device receives a query message from a nearby desktop, it extracts motion data, determines whether it (the authentication device) is a candidate for authentication, and if so, the authentication device proceeds to compute the correlation points that may correspond to the intent action.

Data Extraction

A wristband continually senses motion data and keeps a buffer of the past 10 seconds, similar to fitness trackers and smartwatches. Upon receiving a message $M_q=(A, t_s, t_e)$ at time $T_{rx}$, the wristband extracts accelerometer and/or gyroscope data between the time window $T_{rx}+t_s-\epsilon$ and $T_{rx}+t_e$, where $\epsilon$ is to account for possible communication delays and clock skews, for example, $\epsilon=0.5$ s. The extracted motion sensor data should include the wristband movement during the intent action, but it does not have to precisely match the duration of the intent action. In other words, the extracted data can contain wristband motion data before or after the intent action, but it should encompass the intent action. The $\epsilon$ parameter ensures that the extracted data does include the start of the intent action, so that the desktop can determine whether the user is a candidate for authentication.

Candidate Detection

The candidate detection step determines whether the user intends to authenticate to a desktop—any desktop. There can be multiple authorized users near a target desktop, and this step acts as the first filter to eliminate users with wrist movement significantly different compared to a movement from a wrist that performs an intent action. Being a candidate user does not mean that this user is the one who provided the intent action on the target desktop. It implies that the user's wrist movement is similar to an intent-action wrist movement, and it is likely that the user performed an intent action. But to authenticate the user, the user's intent action should be the same as the intent action on the target desktop; and this comparison—whether the two intent actions are same—is determined in the correlation step.

In an embodiment, an authentication method uses an activity classifier to identify wrist movement that look similar to a wrist movement corresponding to intent actions; the classifier is trained to recognize "walking", "stationary", "writing", "other physical activity", and specific intent actions, "Tap-5×" and "Mouse-Wiggle". The wristband computes the classification feature vector from the extracted sensor data and feeds it to the classifier. If the data is classified as one of the intent actions, the wristband (and its user) is considered as a candidate for authentication, and the wristband extracts correlation points from the sensor data. If the data is classified as a different activity, it implies that the user did not express an intent to authenticate, and should not be authenticated. In an embodiment, an intent detection classifier may be a Random Forest Classifier together with standard activity recognition features. Samples of various motions that a wristband would experience while in use are used to train the classifier.

Correlation Event Detection

For Tap-5×, the correlation events are key-press down (KeyDown) or key release (KeyUp) events, and for Mouse-Wiggle, the correlation events are 180° changes in the mouse trajectory. These events generate small but sudden changes in wrist movement or rotation, which appear as peaks or troughs in the accelerometer and gyroscope sensor data. Thus, the wristband represents an intent action as a sequence of timestamps of peaks and/or troughs that likely correspond to the correlation events.

Depending on the wristband orientation and how the user performs the intent action, the peaks (or troughs) may appear as more prominent in one axis than others. Therefore, correlation points are found along each individual axis (x, y, z) in accelerometer (a) and gyroscope (g) signals; in total, this results in twelve sequences, from six axes and a sequence of peaks (p) and troughs (t) for each axis. Thus, the set $A_w$ consists of twelve sequences representing the intent action:

$$A_w = \{S_{ax}^p S_{ax}^t \ldots S_{gz}^p S_{gz}^t\}$$

Intent Action Correlation

The desktop's intent action set $A_d$ contains two sequences (KeyUp and KeyDown events for Tap-5×, and peaks and troughs for Mouse-Wiggle) that represent the intent action; the wristband's intention action set $A_w$ contains twelve sequences. Correlating sets $A_d$ and $A_w$ includes pair-wise matching of sequences in both sets, computing the correlation score for a pair, and use the highest correlation score to determine whether $A_d$ and $A_w$ represent the same intent action, and whether the wristband user should be authenticated.

For a given pair of sequences of timestamps R (from the desktop) and S (from the wrist), this correlator module generates a correlation score to quantify how well the two sequences correlate. If the two sequences are of same length, then aligning and matching them is straightforward. The wrist signal, however, may be noisy and may have more or fewer peaks (or troughs) than what is expected ($|R| \neq |S|$). In this case, the authentication method matches corresponding timestamps—timestamps that are closest to each other—in both sequences while penalizing missing or extra timestamps in the S sequence. Fortunately, the problem of sequence matching is well studied in bioinformatics. In an embodiment, the Needleman-Wunsch algorithm, used to align protein sequences, may be adapted, but any sequence-matching algorithm may be used. Given two sequences, the algorithm produces two aligned sequences with the maximum similarity score, for a given scoring matrix. For example, for sequences ABCDEF and ABCGF the algorithm would output ABCDEF and ABC-GF as the two aligned sequences. A similarity score for the sequences ABCDEF and ABC-GF is determined by comparing letters at each position: if two letters are the same, it is a match and a positive match value is added to the similarity score; if two letters are different (E and G at fifth position), it is a mismatch and a negative mismatch penalty is added to the similarity score; if there is an insertion or deletion (D and – at fourth position), a negative gap penalty is added to the similarity score. The match value, mismatch penalty, and gap penalty are defined by a predefined scoring matrix. The Needleman-Wunsch algorithm determines the best alignment using dynamic programming.

In an embodiment, a variation of this algorithm is used to align two sequences of timestamps R and S. Two timestamps, $t_1$ and $t_2$ are considered a match if $|t_1 - t_2| \leq \tau$, where i is the matching threshold; if the timestamp difference is greater than $\tau$, they are considered mismatched. In the scoring matrix, a match is 1, a gap is –0.5, and a mismatch is –1. The algorithm computes the similarity score for the aligned sequences as the sum of all matches (number of matches×match score), all gaps (number of gaps in both sequences×gap penalty), and all mismatches (number of mismatches×mismatch penalty). This score is normalized by dividing it by the maximum possible similarity score for sequence R with any other sequence S. The normalized similarity score is used as the correlation score, c, where c=1 indicates perfect correlation between the user's wrist movement and the keyboard or mouse inputs. If the correlation score is greater than the correlation threshold, $\tau_c (c \geq \tau_c)$, the correlation is considered good enough to authenticate the user.

Figure 7:
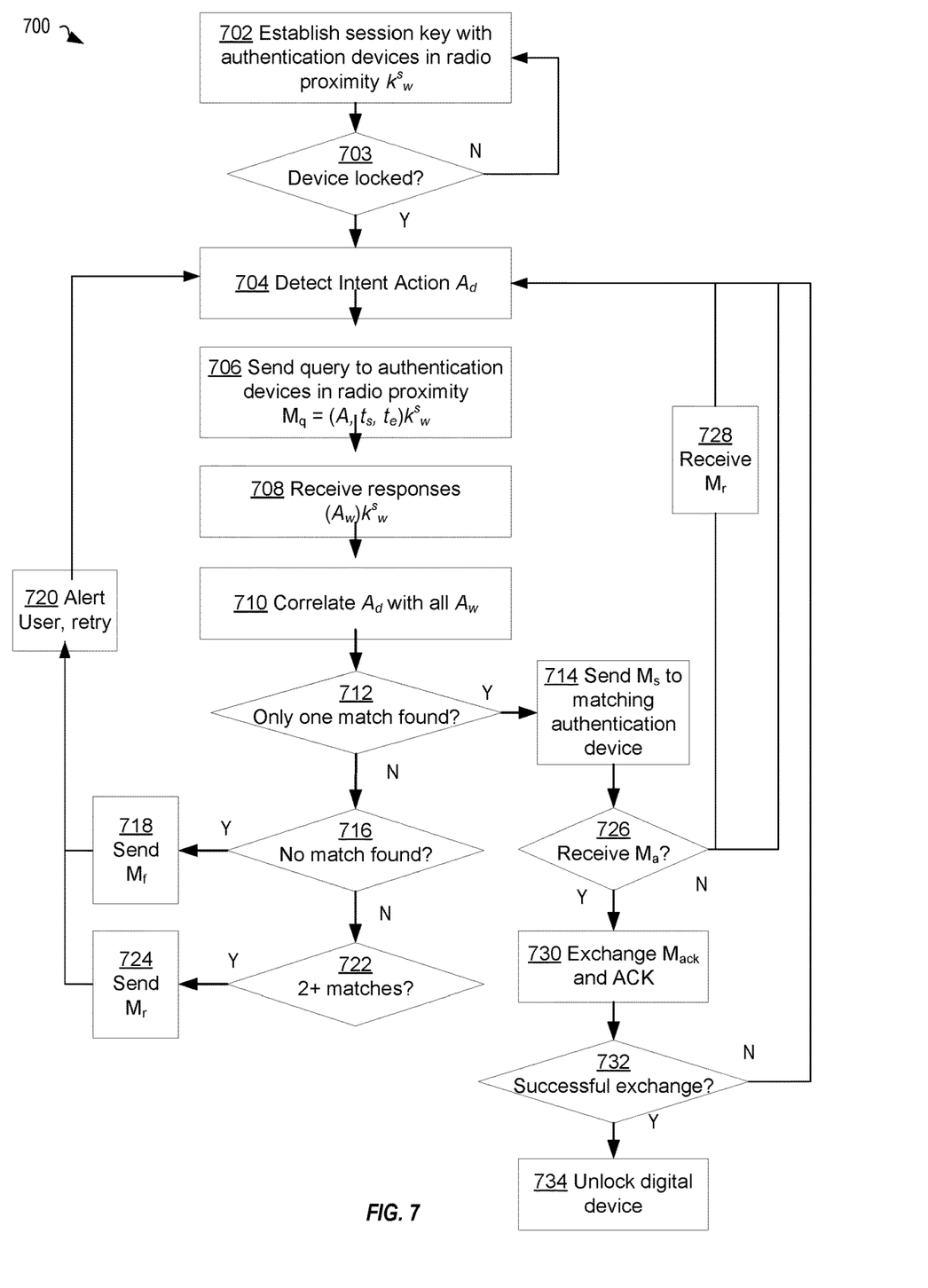
FIG. 7 depicts a flowchart of an authentication method performed by a digital device.

An example of an authentication method as performed by a digital device in a multi-user, shared digital device setting is shown in the flowchart of FIG. 7. A shared digital device scans for nearby authentication devices. When an authentication device is within radio range of the digital device, they establish a session key ($k_w^s$) using the public keys that were shared during the pairing process as described above and shown in step 702.

When a digital device (300 in FIG. 3) is in a locked mode 703 it scans for intent actions in the data from the I/O devices (310 in FIG. 3). When an intent action is detected at 704, the digital device determines a set of correlation points $A_d$ then sends a query to all authentication devices within a certain radio range; the query includes the type of intent action A and the start and end times of the intent action at step 706.

At step 708, the digital device receives responses $A_w$ from nearby authentication devices who received the query. As explained above, $A_w$ may be an empty set. The received sets $A_w$ are correlated one by one with $A_d$ at step 710. Depending on the correlation result, the digital device may perform different actions. If a single matching set $A_w$ is identified at 712, the digital device sends a success message $M_s$ to the corresponding authentication device at 714.

Otherwise, if none of the sets $A_w$ correlate with $A_d$ at 716, the digital device sends a failure message $M_f$ to queried authentication devices at 718, and then users are alerted and a retry process is initiated at 720.

The case in which multiple $A_w$ samples match with $A_d$ at 722, a retry message $M_r$ is sent to devices with matching $A_w$ at 724, and then users are alerted and a retry process is initiated at 720.

After the digital device sends a success message $M_s$ to the corresponding authentication device at 714, it waits for an okay-to-authenticate message $M_a$ from the authentication device at 726. If the digital does not receive $M_a$, or instead received a retry message $M_r$ at 728, it returns to step 704. Otherwise, it may optionally proceed to exchange acknowledgement messages with the authentication device at 730. If the exchange is successful at 732, then the digital device is unlocked at 734 otherwise, the method returns to step 704.

Figure 8:
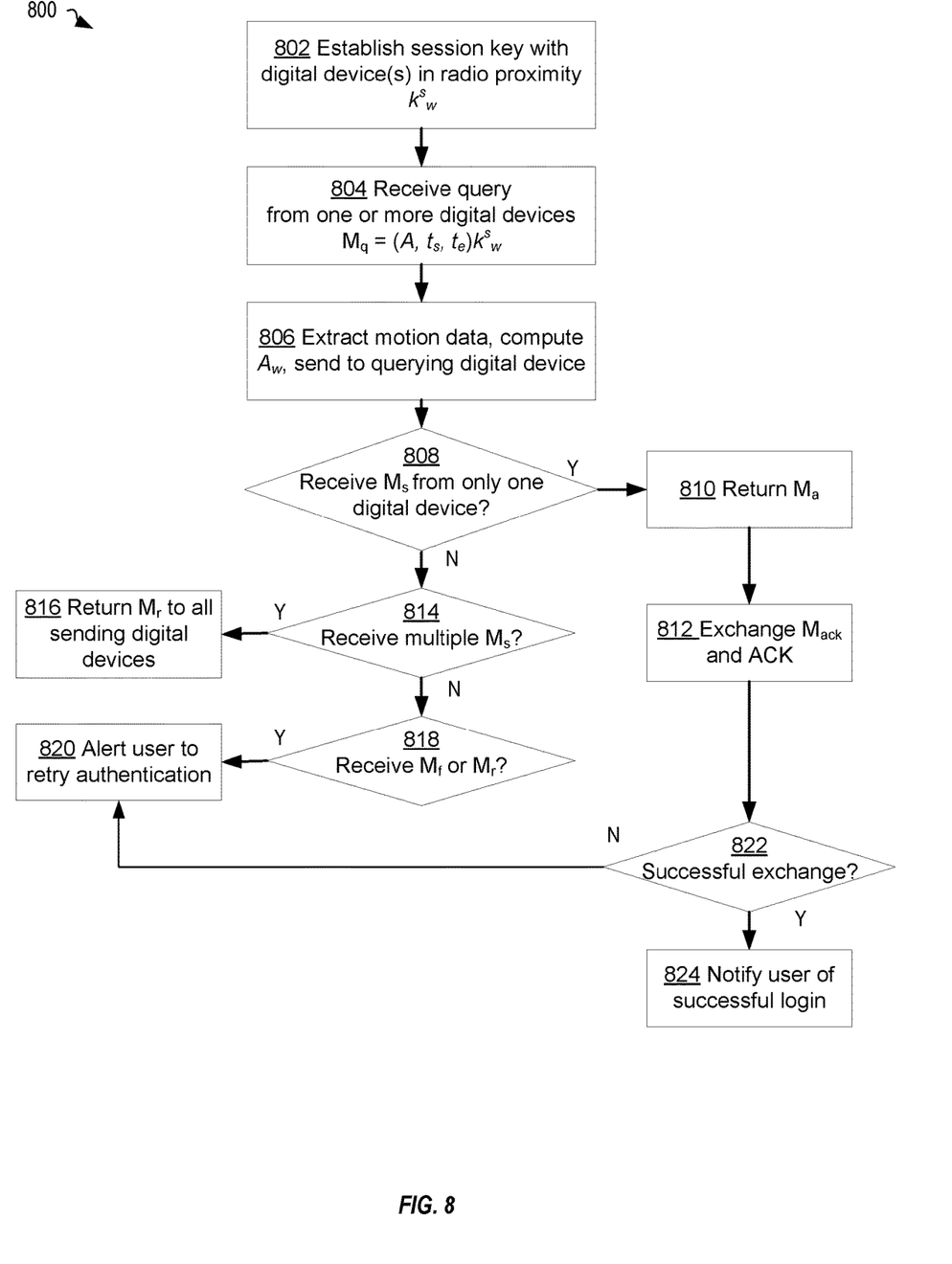
FIG. 8 depicts a flowchart of an authentication method performed by an authentication device.

An example of an authentication method as performed by an authentication device in a multi-user, shared digital device setting is shown in the flowchart of FIG. 8. When an authentication device is within the radio range of the digital device, they establish a session key ($k_w^s$) using the public keys that were shared during the pairing process as described above and shown in step 802.

When an authentication device receives a query from one or more digital devices at 802, it proceeds to extract motion data, compute $A_w$ and send it to the querying digital device at 806. The authentication device then waits for a response from the digital device. If it receives a success message $M_s$ from a single digital device at 808, it responds with an okay-to-authenticate message $M_a$ at 810 and optionally exchanges acknowledgement messages at 812. If the exchange is successful at 822, the user receives a notification of a successful login at 824, otherwise the user is asked to retry authentication at 820. A notification or alert may be conveyed by any of a variety of ways of communication with a user, such as a vibration, audible tone, message on a display, or a color change.

If, at step 814, the authentication receives success messages $M_s$ from multiple digital devices, it sends a retry message $M_r$ to all those digital devices at 816.

If, at step 818, the authentication device receives a failure message $M_f$ or a retry message $M_r$ from a digital device, it alerts a user of the authentication device to retry authentication at step 820.

In embodiments described above, an authentication device extracts motion data from a buffer, computes a set of correlation points $A_w$ and sends it to a querying digital device which performs a correlation as shown, for example, in steps 706, 708, 710 of FIG. 7 and step 806 of FIG. 8. In an alternative embodiment, an authentication device receiving a query may also send motion data from the buffer to the digital device, which then computes the set of correlation points $A_w$ and performs the correlation.

The authentication method described above provides a quick and easy way to perform authentication that can seamlessly blend in users' workflow, minimizing the disruption and saving users' time and effort. The method may be used with custom wristbands, or may also be added to existing smartwatches or fitness trackers, for example, to better serve enterprise customers.

There are several advantages of the authentication system and method:

1. There is no need to memorize a password. While a user does have to remember to wear the wristband, once worn the wristband stays with the user. The goal is to minimize the number of password authentications in a day. If a password is used as a backup authentication method and to activate the wristband, then the user will have to remember the password. But the user does not have to type the password as frequently, and there is no need to memorize any new secret.

2. The authentication method is quick. Authentication time is the sum of communication latency, computation time, and the time required to perform the intent action. Before an authentication attempt, the desktop and the wristband already have established a secure connection, and thereafter communication latency is negligible. In an embodiment, computation (performed on a laptop with 8 GB RAM and 2.6 GHz Intel core i7 processor) took at most 500 milliseconds while users required an average of 1.5 seconds and 4 seconds to perform Tap-5× and Mouse-wiggle, respectively. Thus, overall, the authentication method takes about 2 seconds with Tap-5× and 4.5 seconds with Mouse-wiggle.

3. The authentication method is User Agnostic. A user-agnostic method does not depend on a user's unique characteristics, e.g., in the context of computer use, how she types or how she moves a mouse. User-agnostic methods offer two advantages: 1) they do not need user-specific training, and 2) they are resilient to changes in user behavior.

4. The authentication method is secure in that it requires explicit intent to log in to a desktop. Further, since there is no visible secret information exchanged between the user and the desktop, the method is resilient to physical observation—unlike passwords, which may be easily stolen by an observer. In addition, accidental logins are unlikely, if not impossible, due to the dual correlation of desktop and wrist motion. Likewise, if either a wristband or a desktop detects multiple correlations at a time, the user is asked to retry the authentication, thereby minimizing the possibility of an intentional mimicking attack.

Changes may be made in the above system, methods or device without departing from the scope hereof. For example, alternative wireless protocols may be used instead of Bluetooth. Further, an authentication device may be any apparatus that is capable of being attached to a user or the user's clothing to detect hand or arm motions. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for authenticating an authorized user to a locked digital device, said authorized user wearing an authentication device comprising at least one accelerometer, a digital radio and a processor, the method comprising:
    detecting an intent action performed using an input apparatus of the locked digital device with an arm associated with the authentication device;
    sending a query to an authentication device in radio proximity of the digital device, said query comprising start and end times of the intent action;
    receiving data representing authentication device motion extracted from a buffer in the authentication device between the start and end times in the query from the authentication device;
    correlating the data representing authentication device motion with the detected intent action input;
    sending a correlation message to the authentication device, the correlation message comprising a success message ($M_s$), a failure message ($M_f$) or a retry message ($M_r$); and
    receiving an authentication response from the authentication device:
        the authentication response comprising an okay-to-authenticate message ($M_a$) if the correlation message is the success message ($M_s$); or
        if the correlation message is the failure message ($M_f$) or the retry message ($M_r$), alerting the authorized user to retry the intent action; and
    unlocking the digital device based on the authentication response.

2. The method of claim 1, further comprising, after the receiving an authentication response step:
    sending authentication request message ($M_{ack}$) to the authentication device.

3. The method of claim 2, wherein a plurality of authentication devices are located in radio proximity of the digital device and the digital device sends a query to each of the plurality of authentication devices.

4. The method of claim 1, wherein correlating the data further comprises generating a set of data points from the data representing authentication device motion.

5. The method of claim 1, further comprising:
establishing a session key when the authentication device is within radio proximity of the digital device, said session key based on a public-key exchange during a pairing of the authentication device with the digital device.

6. The method of claim 1, further comprising activating the authentication device by associating it with an authorized user.

7. The method of claim 1, wherein the input apparatus further comprises a keyboard or mouse.

8. The method of claim 7, wherein the intent action further comprises tapping a key multiple times, where the number of times may vary depending on the use case or user preference.

9. The method of claim 7, wherein the intent action further comprises moving a mouse through a plurality of direction changes.

10. A system comprising:
at least one authentication device worn on an arm or wrist of an authorized user, the authentication device comprising:
at least one accelerometer;
a digital radio; and
an authentication device processor configured to provide motion data detected by the at least one accelerometer in response to a query message received by the digital radio; and
at least one digital device comprising at least one digital radio adapted to communicate with the at least one digital radio of the authentication device, at least one input apparatus and at least one digital device processor configured to:
detect an intent action performed using the at least one input apparatus with an arm associated with the authentication device;
send a query to the authentication device, the query comprising an identification and start and end times of the intent action;
receive motion data extracted from a buffer in the authentication device between the start and end times in the query from the authentication device; and
correlate the intent action and the motion data;
sending a correlation message to the authentication device, the correlation message comprising a success message ($M_s$), a failure message ($M_f$) or a retry message ($M_r$); and
receiving an authentication response from the authentication device:
the authentication response comprising an okay-to-authenticate message ($M_a$) if the correlation message is the success message ($M_s$); or
if the response if a failure message ($M_f$) or a retry message ($M_r$), alerting the authorized user to retry the intent action; and
unlocking the digital device based on the authentication response.

11. The system of claim 10, further comprising a plurality of authentication devices and a plurality of digital devices.

12. The system of claim 10, further comprising a plurality of authentication devices and at least one digital device.

13. The system of claim 10, wherein the input apparatus further comprises a keyboard or mouse.

14. The system of claim 13, wherein an intent action input further comprises tapping a key multiple times, where the number of times may vary depending on the use case or user preference.

15. The system of claim 13, wherein the intent action further comprises moving a mouse through a plurality of direction changes.

16. An authentication device for authenticating an authorized user to a locked digital device, said authentication device adapted to be worn by the authorized user and comprising at least one accelerometer, a digital radio and a processor, the processor executing instructions stored in a non-transitory computer readable medium to perform a method comprising:
receiving a query from the locked digital device, said query comprising start and end times of an intent action performed using an input apparatus of the locked digital device with an arm associated with the authentication device;
sending data representing motion of the authentication device between the start and end times in the query to the digital device for correlation with data generated from the input apparatus, further comprising extracting motion data between approximately the start and end times in the query from a buffer in the authentication device and sending the motion data to the digital device;
receiving a response from the digital device:
if the response is a success message ($M_s$), returning an okay-to-authenticate message ($M_a$);
if the response is a failure message ($M_f$) or a retry message ($M_r$), alerting the authorized user to retry the intent action.

17. The authentication device of claim 16, further comprising:
if the authentication device receives more than one success message ($M_s$), returning a retry message $M_r$.

18. The authentication device of claim 16, wherein sending data representing motion further comprises:
analyzing the motion data to classify it as an intent action identified in the query or some other motion;
extracting a set of data points representing the motion data corresponding to the intent action; and
sending the set of data points to the digital device.

19. The authentication device of claim 16, wherein the input apparatus of the locked digital device further comprises a keyboard or mouse.

20. The authentication device of claim 19, wherein the intent action further comprises tapping a key multiple times, where the number of times may vary depending on the use case or user preference.

21. The authentication device of claim 19, wherein the intent action further comprises moving a mouse through a plurality of direction changes.

22. The authentication device of claim 16, wherein the processor further executing instructions to establish a session key when the authentication device is within radio proximity of the locked digital device, said session key based on a public-key exchange during an activation of the authentication device.

* * * * *